United States Patent [19]

Zwicky et al.

[11] Patent Number: 4,851,757
[45] Date of Patent: Jul. 25, 1989

[54] METHOD AND SYSTEM FOR REDUCING AT LEAST ONE FREQUENCY COMPONENT OF A PERIODIC PULSATION

[75] Inventors: Ruedi Zwicky, Wettingen, Switzerland; Thomas Weber, Ossining, N.Y.; Dominik Baumgartner, Zurich, Switzerland

[73] Assignee: Gebr. Sulzer AG, Switzerland

[21] Appl. No.: 120,849

[22] Filed: Nov. 16, 1987

[30] Foreign Application Priority Data

Nov. 17, 1986 [CH] Switzerland .......................... 4583/86

[51] Int. Cl.$^4$ ........................... H02P 9/10; H02P 9/14; F02N 11/04
[52] U.S. Cl. ..................................... 322/58; 290/40 B; 290/51; 322/17; 322/22
[58] Field of Search ...................... 322/58, 14, 15, 17, 322/19, 22; 290/40 B, 40 F, 51

[56] References Cited

U.S. PATENT DOCUMENTS

| | | | |
|---|---|---|---|
| 4,080,559 | 3/1978 | Wright et al. | 322/58 |
| 4,329,637 | 5/1982 | Kotake et al. | 322/58 X |
| 4,384,246 | 5/1983 | Larsen et al. | 322/58 |
| 4,413,223 | 11/1983 | Yundt et al. | 322/32 |
| 4,463,306 | 7/1984 | de Mello et al. | 322/25 |
| 4,701,689 | 10/1987 | Yuan et al. | 322/58 X |

OTHER PUBLICATIONS

Hinrichsen, "Controls For Variable Pitch Wind Turbine Generators", IEEE, 4/84.
Phillips, "A Microprocessor-Based Engine/Generator Control System", IEEE-IECI 1980, 3/1980.

Primary Examiner—R. J. Hickey
Attorney, Agent, or Firm—Louis Weinstein

[57] ABSTRACT

Pulsations in an electrical parameter on the output of a synchronous generator powered by a Diesel engine at a frequency which differs from that of the synchronous generator's natural frequency are smoothed out, whereby, a controlled variable (X) corresponding to the pulsation is tapped from the stage formed by the Diesel engine (5), the generator (3), and the network (4). From this controlled variable (X) and a reference input (W), a control difference (Δ) is calculated, by means of which a correcting variable (y) is set in the stage indicated for the purpose of control.

45 Claims, 3 Drawing Sheets

FIG.1

METHOD AND SYSTEM FOR REDUCING AT LEAST ONE FREQUENCY COMPONENT OF A PERIODIC PULSATION

BACKGROUND OF THE INVENTION

The present invention pertains to a method and a system for reducing at least one frequency component of a periodic pulsation in at least one electrical parameter at an output of a synchronous generator powered by a pulsating drive momentum of a drive engine, where the fundamental frequency of the pulsation with said component to be reduced deviates from the natural frequency of said synchronous generator.

In addition, the present invention pertains to the use of the method and system for large, Diesel engine-driven synchronous generators.

When a synchronous generator is driven with a momentum or torque which fluctuates in time, this affects the electrical parameters at the output, that is, on the stator side of the generator. These fluctuations of momentum occur especially when large Diesel engines are used to drive synchronous generators and when wind turbines are used as power sources. The generators are driven in these cases at relatively low speeds of 60–120 rpm.

The pulsations in the momentum driving the synchronous generator are usually not sinusoidal, so that pulsation components of higher harmonic frequencies with respect to the fundamental frequency of the pulsation are produced; that is, the frequency spectrum of the pulsation is discrete, with several frequency components or spectral lines, among which there is also the component accounted for on the fundamental frequency.

Depending on the frequency behavior of the synchronous generator, its drive shaft, and its output-side network, one or more of these components are amplified to a particular degree as a result of the resonance behavior of the partial stages mentioned. Thus, in turn, a pulsation with various frequency components usually appears on the output side of the generator, and certain of these frequency components appear in amplified form. When we speak in the following of a frequency component of the pulsation to be reduced on the output side of the synchronous generator, the fundamental frequency of which differs from the synchronous generator's own frequency, that is the system frequency, we mean the spectral line of the pulsation which appears on the output side with such a large amplitude that the disturbance thus caused should be reduced. The frequency of the most highly troublesome component can usually change over the course of time, e.g., when the resonance behavior of the partial stages mentioned above changes, as in the case of changes in load on the network side.

Synchronous generators are usually equipped with a so-called P/f control system which is a system for active power control by torque adjustment, by means of which the mean value of the active power transmitted to the network is kept constant. This is done by adjusting the torque of the drive engine.

Fluctuations in the active power output P cannot be corrected quickly, however; they are, in fact, corrected much more slowly than would be necessary to eliminate the pulsation component to be reduced as mentioned above, which has a frequency in the range of a few Hz. When a synchronous generator of this type is used as a power plant generator on a rigid network, a so-called Q/U controller which is a system for output voltage (i.e., reactive power) control by exitation adjustment of the generator is also usually provided. On the output side of the generator, the reactive power Q is measured, and the mean value of the reactive power is kept constant by adjusting the excitation of the generator, that is, by adjusting the excitation voltage. This form of control can also be much too slow in the sense described above.

In a rigid network, the pulsations in the momentum of the drive engine mentioned above bring about pulsations of active power components with amplitudes in the area of about 5–20% of the mean active power at pulsation component frequencies of a few Hz.

When a power plant system of this type is operated in an isolated mode, a U-control system is usually installed, which latter system taps the voltage being sent to the network and keeps it constant by controlling the excitation of the synchronous generator. In this case, the pulsations in the momentum of the drive engine indicated bring about voltage component amplitudes in the area of 10 Hz on the order of 0.5% of the mean voltage value.

The pulsation components mentioned cause disturbing effects on the load side both in rigid networks and in isolated systems. When the system is part of a rigid network, these pulsations act on the other power plants connected to the same network, which attempt to smooth out these pulsations; in an isolated system, however, interfering effects occur in spite of the relatively small amplitudes of the component mentioned, i.e., precisely in the range of 10 Hz, such as disturbances in light sources connected in the network, in that this frequency is situated precisely in the area of the greatest sensitivity of the eye, which is also in the area of 10 Hz. In this range, the eye perceives even very slight variations in the amplitude of light sources. The effects of the moment pulsations indicated can, as mentioned, appear in even more emphatic form when the fundamental frequency of the momentum pulsations or the frequency of a harmonic component is situated at a resonance point of a synchronous generator connected to a network or at a resonance point of the drive shaft between the drive engine and the synchronous generator.

It is known, for example, from U.S. Pat. Nos. 4,080,559; 4,463,306; and 4,413,223; from G. R. Phillips, "A microprocessor-based engine/generator control system", IEEE, 1980, IECI Proceedings, "Applications of Mini- and Microcomputers", Philadelphia, Mar. 17–20, 1980, IEEE, U.S., pp. 377–380; and from E. N. Hinrichsen, "Controls for variable-pitch wind turbine generators", IEEE Transactions on Power Apparatus and Systems, Vol. PAS-103, No. 4, April 1984, IEEE, New York, U.S., pp. 886–892, that system stabilizers can be provided for synchronous generators powered by drive engines, by means of which the overall system is stabilized in principle by shifting appropriately to the left the pole positions of the system transfer function.

As known from U.S. Pat. No. 4,080,559, however, when stabilizers of this type are installed, the problem is that low natural frequencies of the mechanical coupling are excited, and that thus the entire system together with the stabilizers acts as a positively fed back system at these low frequencies. In the U.S. patent last mentioned above, this problem is solved by interrupting the action of the stabilizer at these natural frequencies. The feed-back control circuit is made ineffective at these natural frequencies, and the system thus operates without feed-back control at these frequencies. The result of this measure is that the pulsations brought about by the stage consisting of the drive engine and the generator is no longer excited to oscillate at these natural mechanical frequencies; instead, they appear undamped at a greater or lesser intensity on the output side in accordance with the fact that the feed-back system is now open at these frequencies. Whereas in this way, especially as indicated in this publication and generally in conjunction with the installation of stabilizers to stabilize the entire system, the goal is to avoid exciting pulsations, which e.g. arise on such natural mechanical frequencies, the present invention is based in principle on not simply leaving pulsations with such low fundamental frequencies undamped in their unaffected form but rather on reducing them. Thus the goal of the present invention is to reduce the pulsation components indicated on the output side of the synchronous generator, thereby keeping stability of the overall system, in terms of automatic feed-back system theory.

BRIEF DESCRIPTION OF THE INVENTION

This is achieved in a method of the type mentioned above in that:

the component of the electrical parameter is detected as the controlled variable;

a control difference is determined from the detected controlled variable and a preestablished reference value;

as a function of the control difference, at least one physical parameter of a stage formed by the drive engine, the synchronous alternator, and the network connected to the synchronous generator is automatically corrected or adjusted within an automatic negative feed-back control loop.

The insight on which this method is based is that feed-back control devices already installed on synchronous generators powered by a drive engine such as P/f controllers, Q/U controllers, and U-controllers, which controllers have been described above, are too slow to eliminate the components indicated. The inventors recognized that stable feed-back control according to the invention is possible, even though the open feed-back loop must ensure high amplification or gain of the open control circuit at the component frequency, i.e., at frequencies which are high with respect to the frequency behavior of the stage, which has low-pass characteristics as a first approximation.

When the synchronous generator is powered by a Diesel engine as the drive engine, it is also proposed that the feed-back control system acts on the cause of the pulsation and thus on the cause of the component, by adjusting or correcting instantaneous operating conditions in the cylinders of the Diesel engine, such as the fuel injection time and/or the amount of fuel injected.

In a further design variant of the method according to the invention, the excitation of the synchronous generator is adjusted or corrected as the physical parameter. This can be done in addition to the intervention already mentioned in the Diesel engine serving as the drive engine, but it is preferred especially when the drive engine offers little or no opportunity for regulating intervention.

As already mentioned above, it is conventional when operating, for example, a synchronous generator on a rigid network, to provide a feed-back control for the reactive power Q. Now the reactive power Q does not necessarily have to be that electrical parameter at the output of the synchronous generator whose pulsation components are the principal source of disturbance. It can be pulsation components of the active power which are causing the interference, for example. To take account of both needs, it is also proposed that an additional electrical parameter be measured as an additional controlled variable; that from this value and an additional reference value an additional control difference be determined and an additional physical parameter of the stage be adjusted in a controlling sense, i.e. within a feed-back loop, as a function of the additional control difference.

Now in the case of systems which offer no opportunity for adjusting or correcting intervention in the drive engine, the number of additional possible control interventions in the stage is limited. For this reason, it is also proposed that the same physical parameter in the stage be acted on as both the physical parameter and the additional physical parameter.

For this purpose it is also proposed that the feed-back control of the one controlled variable and the feed-back control of the additional controlled variable be decoupled with respect to each other with respect to frequency, that preferably the feed-back control of the one controlled variable be made selectively on one frequency according to the frequency of the component, whereas the control of the other controlled variable be made over a wide frequency band.

Another embodiment of the method according to the invention derives from the fact that an impedance appearing on the output side of the synchronous generator, such as a reactive power compensator, is adjusted as the additional physical parameter.

Thus an additional independent opportunity for feed-back control intervention is exploited.

Especially when the feed-back control of the one controlled variable and the feed-back control of an additional controlled variable involves intervention in the same correcting variable, i.e. the same physical parameter, such as in the excitation of the synchronous generator, it is also proposed that, with respect to the frequency of the component to be reduced, reference values which are dependent upon each other be selected for the two feed-back control loops.

If, for example, the generator excitation is corrected or adjusted to smooth out the pulsation component of the active power in a feed-back loop, and additionally the mean value of the reactive power is feed-back controlled, the problem which thus arises, namely, that the degree of freedom for adjusting the generator by way of excitation is only 1, is solved in that, for example, the active power component is smoothed out only in a frequency-selective feed-back control. Thus the situation is created with respect to the component frequency that the feed-back control for the second, additional controlled variable becomes active only as a function of the action of a first control loop for the one controlled variable, which means that, by setting the reference value for the one of the two controlled variables, the reference value for the other controlled variable is also defined. By means of appropriate weighting of the reference values it can be decided, as a compromise, how intensely the two controlled variables at the frequency indicated may show up in the two electrical parameters. This compromise is determined by setting the reference values for the two automatic feed-back control loops in dependence on each other.

To implement the control method at the component frequency effectively enough with relatively simple means and nevertheless ensuring the stability of the entire feed-back control circuit, it is also proposed that a shift signal, i.e. an AC-signal, be generated at a frequency equal to that of the component—if several components are to be smoothed out, then several shift signals will be generated analogically, and the physical parameter is corrected therewith, the amplitude and/or phase of the shift signal or signals being adjusted as a function of the control difference or of the control differences.

The synthesizing of the shift signal indicated at the frequency of the component automatically provides for the fast correcting signal component, which now is amplitude-adjusted and/or phase-adjusted as a function of the control difference. The transfer elements, which act on amplitude and/or phase adjustment of the shift signal, can be designed to act more slowly than would be necessary in principle for satisfactory feed-back control action at the frequency mentioned. The amplification or gain of the open feed-back control circuit thus formed is selectively high at this frequency, but not at frequencies deviating from it, so that the stability problems of the feed-back control mentioned above are avoided.

The frequency of the disturbing pulsation component to be reduced is often known. Variations in time are nevertheless quite possible, however; they can be caused, for example, when the drive speed varies or by a change in the resonance behavior of a partial stage, e.g. as a result of a change in the impedance of the network. This can change the frequencies at which pulsation components in the moment appear in an undesirably amplified form at the output of the synchronous generator. For this reason, it is also proposed that the instantaneous frequency of the component most disturbing be measured and that this value be used to control the frequency of the shift signal.

As will be described below, the shift signal is generated in a preferred embodiment from two orthogonal shift signal components as from a cos and a sin component which are added together in a weighted manner.

The shift signal which corrects the physical parameter in the stage must be adjustable with respect to both its amplitude and its phase so that it can smooth out the component to be reduced at the output of the generator. For this purpose, it is proposed in another variant that the amplitude and the phase of the shift signal be set successively and that the control difference be observed and minimized successively.

If the physical parameter used as the correcting variable is modulated by the shift signal mentioned, first with a freely selected amplitude and phase, and if now the phase of the shift signal is adjusted, it can be observed in the control difference that its amplitude value is shifted at the component frequency from a minimum to a maximum and vice versa. Thus, as the first step, the correct phase position of the shift signal can be set as the correcting signal for the physical parameter by adjusting the phase of the shift signal and by observing signal components at the component frequency. The second step is to adjust the amplitude of the shift signal until the control difference has been minimized at that frequency.

A simple realization of the shift signal is obtained preferably by programming the expressions:

$$\ddot{z} + \omega_{pn}^2 = \Delta(\omega_{pn}) \tag{1}$$

$$u' = \alpha_1 \dot{z} + \alpha_2 z \tag{2}$$

where
- $\omega_{pn}$ = the angular frequency of the pulsation component to be reduced;
- $\Delta(\omega_{pn})$ = the control difference;
- $z$ = an auxiliary parameter of state; $\dot{z}$ and $\ddot{z}$ are its first and second derivatives with respect to time;
- $\alpha_1$, $\alpha_2$ = coefficients, preferably stage-specifically adjustable;
- $u'$ = the shift signal for setting the physical parameters.

It is further proposed as a preferred embodiment that the control be carried out in state space according to state variable feed-back control theory and that at least the controlled variable or variables be used as the output variable (s) of the stage and at least the physical variable (s) be used as the input variable (s) of this stage.

Because, with a state feed-back control, the vector of state of the stage formed by the synchronous generator and its load, possibly together with the drive engine, is usually not obtained directly from measurements of electrical parameters at the synchronous generator, it is also proposed that the state variables of the stage be determined by way of an observer on the basis of the input and output variables.

A system according to the invention of the type indicated above for solving the problems mentioned comprises an automatic feed-back control loop with
(a) detector means, connected to the stage formed by the drive engine, the synchronous generator, and the network fed by the generator, for detecting at least one signal as a controlled variable signal in dependency from the component to be reduced;
(b) a controller means, which is connected to the output of the detector means; and
(c) at least one correcting means connected to the output of the controller means, which means corrects on the output side at least one physical parameter of the stage, on which parameter the component depends.

Preferred embodiments of method and the system according to the invention are specified in the claims appended hereto.

The method according to the invention and the device according to the invention are suitable especially for use in conjunction with Diesel engine powered or wind turbine-driven synchronous generators.

The invention is explained below by way of example on the basis of figures of which, briefly:

DETAILED DESCRIPTION OF THE INVENTION AND THE PREFERRED EMBODIMENTS THEREOF

Figure 1:
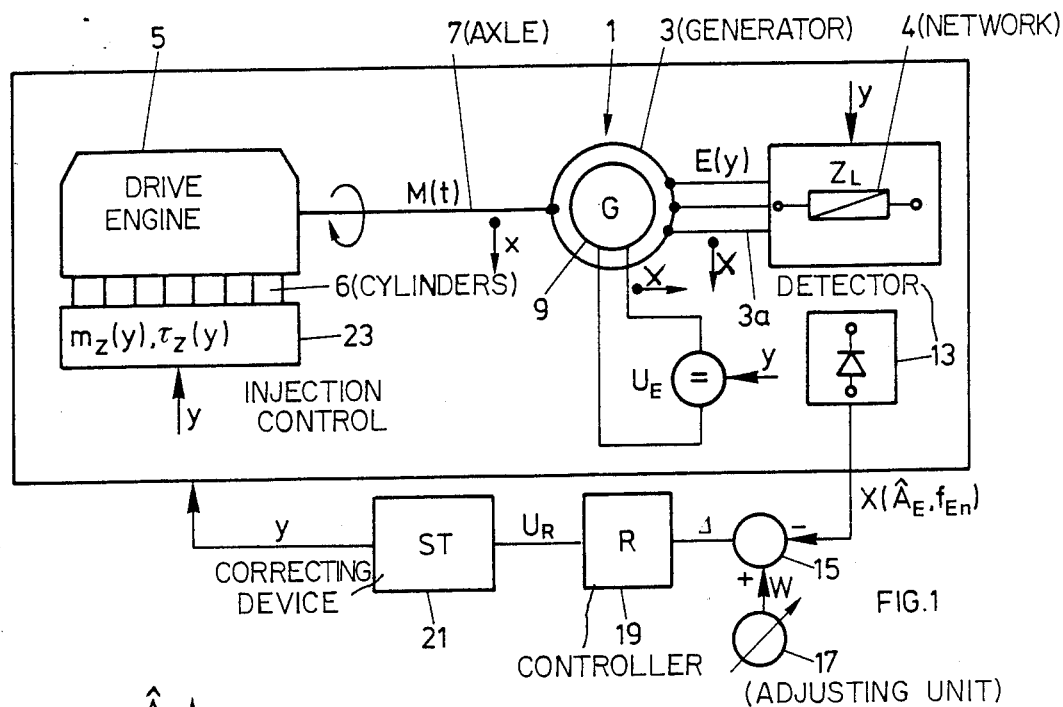
FIG. 1 is a schematic diagram of the feed-back control system according to the invention.
Figure 2A:
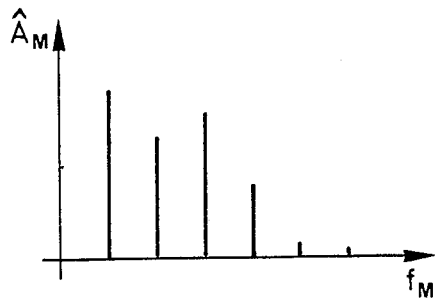
FIG. 2a shows by way of example in a qualitative manner the frequency spectrum of a pulsating drive momentum M on the system according to FIG. 1.

According to FIG. 1, a synchronous generator 1 with a stator 3 and a three-phase output 3a on the network side is powered by a drive engine, such as a large Diesel engine 5, which turns relatively slowly, via a drive axle 7. Rotor 9 of synchronous generator 1 is operated under direct voltage $U_E$ from a source 11. Source 11 can involve static excitation with rectifiers or a rotating exciter machine with an auxiliary excitation. Synchronous generator 1, however, can also be a self-exciting synchronous generator, in which case source 11 is then a rectifier for generator 1 connected on the network side. When drive engine 5, such as the large Diesel engine mentioned, acts with a momentum M(t) which pulsates over the course of time on synchronous generator 1, at least one electrical parameter E pulsates at output 3a. In the case of a large Diesel engine, the momentum pulsating over time can be caused, for example, by operating asymmetries of the individual cylinders 6. The periodic pulsation of the drive momentum M(t) is usually not sinusoidal and thus exhibits a frequency spectrum like that shown in FIG. 2a, with amplitudes $A_M$ of the individual frequency components of the pulsation.

Figure 2B:
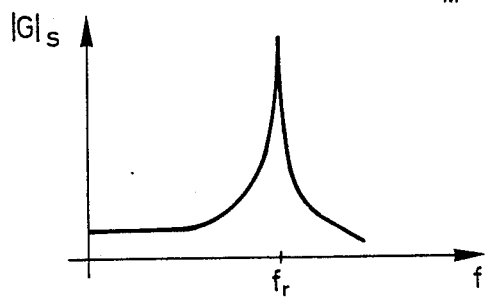
FIG. 2b shows by way of example in a qualitative manner the frequency behavior of a signal transmission between the drive moment and a controlled variable X in the system according to FIG. 1, so e.g. of the synchron generator.
Figure 2C:
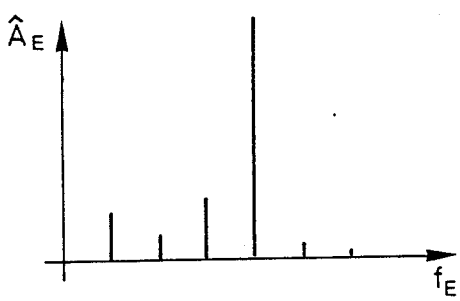
FIG. 2c shows the qualitative frequency line spectrum, resulting from the diagrams according to FIG. 2a and 2b, of controlled variable X as an electrical parameter E to be controlled in the system according to FIG. 1.

FIG. 2b shows qualitatively by way of example the frequency behavior of the transmission between the pulsating drive momentum M(t) and the electrical parameter E of interest at the output of synchronous generator 1. If, as shown, this transmission behavior has resonance points, such as at frequency $f_r$, the correspondingly situated frequency component of the momentum pulsation according to FIG. 2a, appears in amplified form, as shown in FIG. 2c, in the electrical parameter of interest on the output side of generator 1. Which frequency component causes the most disturbance in the electrical parameter of interest on the output side differs from case to case. It can, as shown, be a matter of the fundamental frequency component of the momentum pulsation, but it can also involve a harmonic component of this fundamental frequency, possibly amplified by the frequency behavior of the stage indicated, as of generator 1 and/or axle 7 and/or network 4.

When generator 1 is connected to a rigid network 4 and is provided with a Q/U feed-back control loop (reactive power/voltage), the electrical output parameter E which pulsates with the drive momentum will be the active power P; when the generator is operating in isolated mode, this parameter is the terminal voltage U of generator 1.

As is also shown in FIG. 1 in a general manner, at least one controlled variable signal X is measured according to the invention by means of a detector unit 13 in the complete stage between drive engine 5 and network 4; the measured variable X is dependent on the electrical output parameter E, the pulsations of which are to be smoothed out. We speak of a "dependency", because it is irrelevant in this context whether the measured variable X depends causally on electrical parameter E or vice versa.

The measured variable X is a measure of the amplitude $A_E$ of the frequency component of interest in electrical parameter E at frequency $f_E$.

The measured parameter X can be, for example, the pulsating drive momentum M(t) itself, the pulsation of the pulsating electrical parameter E, or possibly pulsations in the excitation current circuit of generator 1 caused by retroaction. It is also possible to use mechanical vibrations as the controlled variable signals X measured by detector unit 13. With respect to frequency, it must be emphasized that the measured controlled variable signal X does not necessarily have to contain significant components at the frequency, such as $f_r$ according to FIG. 2b, which corresponds to the most disturbing frequency component on the output side.

A difference unit 15 compares controlled variable signal X with a reference input signal W, which can be appropriately preset by means of an adjusting unit 17; the control difference Δ appearing at the output side of difference unit 15 is converted by a controller 19 into a control signal $U_R$ for a correcting device 21, at the output of which a correcting variable signal Y appears. Correcting device 21 acts by means of correcting variable signal Y in turn on the stage between drive engine 5 and network 4. Correcting variable signal Y can be one or more of the following physical parameters:

the cylinder-specific amount of fuel injected $m_z$ (Y);

the cylinder-specific injection time $\tau_z$ (Y), both of these being adjustable on an appropriately controllable injection control unit 23, on large Diesel engine 5;

the excitation voltage source 11; or the impedance 4 appearing on the output side of synchronous generator 1.

To smooth out the fundamental frequency component and/or harmonic frequency components in the electrical parameter E of interest, correcting variable signal Y will have to have signal components of at least the fundamental frequency or the respective harmonic frequency. To smooth out the disturbing components in spite of their possibly small and yet disturbing amplitude values, the amplification of the open negative feed-back control loop circuit will have to be considerably greater than unity, at least at the frequency of the disturbing component. This represents a problem with respect to stability in view of the frequency behavior of the stage including the synchronous generator. For this reason, a shift AC-signal is synthesized by controller 19, the amplitude and/or phase of which are adjusted in such a way as a function of the control difference Δ that the latter is minimized. In this way, a frequency-selective feed-back control is achieved, which makes it possible to solve the stability problems of the type indicated which would occur when the open control circuit would have a uniformly high level of amplification at least as far as the fundamental frequency of the pulsation or even up to its harmonics.

The phase of the AC-shift signal synthesized in controller 19 must be determined according to the phase shift between the controller output and the controlled variable signal X detected by detector 13, a phase shift which is determined primarily by synchronous generator 1 and network impedance 4. It is usually not known in advance and can change over time, as in the case of changes in the network impedance. In addition to the phase of the AC-shift signal indicated, it is obvious that its amplitude must also be adjusted to absolutely minimize the control difference.

Figure 3:
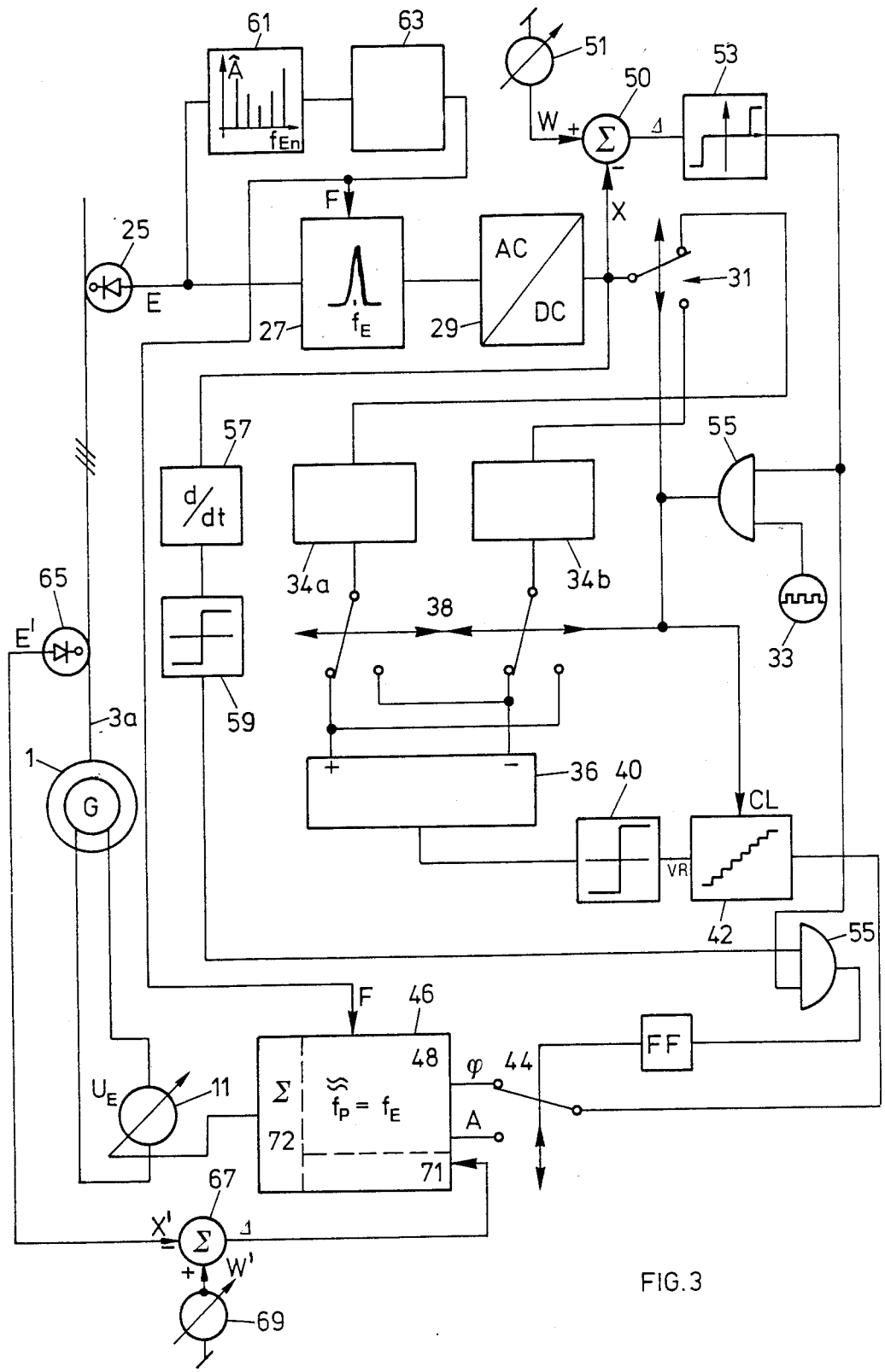
FIG. 3 shows in function block diagram form a first embodiment of the method according to the invention and of the device according to the invention.

FIG. 3 shows a first embodiment of the present invention, in which correction is carried out by means of the chronologically separate adjustment of this phase and this amplitude under simultaneous observation, i.e. detection of the reaction in the controlled variable or in the control difference. Because it often occurs that no control or correcting intervention can be made in the drive engine, such as in large Diesel engine 5, the excitation voltage $U_E$ of the synchronous generator is used in an additional, preferred embodiment as the correcting variable signal.

It must be kept in mind, however, that when no direct intervention can be made in the source of the pulsations indicated, such as in the operation of the Diesel engine cylinders, control is implemented in such a way that now a correcting variable at the same frequency as that of the frequency component causing the disturbance in the electrical parameter E is used for intervention.

On the output side of generator 1, the electrical parameter E is measured, according to FIG. 3, by means of a detector 25, illustrated in schematic fashion, and the amplitude of the frequency component to be smoothed out is determined in a frequency-selective filter 27 and a downline AC/DC converter 29. A switch 31 connected downline from the AC/DC converter 29, controlled by a clock 33 through gate 55a, switches the output of the AC/DC converter back and forth between memory units 34a and 34b. The outputs of memory units 34a and 34b are connected to a comparator 36 by way of a switching unit 38, also driven by clock 33 through gate 55a. Thus amplitude values of the frequency of the disturbing component are read alternately into memories 34a, 34b, and comparator 36, with switching unit 38, compares in each case an earlier amplitude value with a later one. The polarity of the output signal of comparator 36 led over a zero comparator 40 indicates whether an earlier amplitude value is greater than a later one or vice versa. The output of zero comparator 40 is set to a control input VR of a function generator 42.

Function generator 42, coupled to clock 33 by gate 55a, is clocked by clock 33 at a clock input CL, and generates at its output a signal which changes by one increment per cycle of clock 33; the direction of this change, i.e., whether in the increasing or decreasing sense, is controlled by the signal at control input VR. A switch 44 connects the output of function generator 42 either to an amplitude control input A or a phase control input $\psi$ of a controller 46 yet to be described. Controler 46 comprises an oscillator 48, which oscillates at the frequency of the disturbing component in electrical parameter E to be smoothed out. The amplitude and phase of oscillator 48 can be adjusted by acting on inputs A and $\psi$ mentioned respectively. On the output side, controller 46 acts on the modulatable source 11 for the excitation voltage $U_E$ of synchronous generator 1. The output of AC/DC converter 29 is also sent as a controlled variable signal X to a comparing unit 50, which also receives an adjustable reference input signal W from an adjusting unit 51. The control difference $\Delta$ appearing on the output side of comparing or difference unit 50 is sent to a window comparator 53. The output of window comparator 53 operates logical AND gating elements 55a and 55b to control the transmission of the signal from clock 33 to the corresponding switching units 31, 38, and 44.

The system described above operates as follows: If the measured amplitude at the output of AC/DC converter 29 differs by more than the preset value from the reference value, corresponding to the reference input signal value W, clock 33 is turned effective by window comparator 53. Depending on the result of the comparison in comparator 36, a control signal which changes in a stepwise fashion is applied first, for example, to phase control input $\psi$, and thus the phase of oscillator 48 at controller 46 is adjusted in such a way that the measured amplitude on the output side of AC/DC converter 29 comes closer and closer to the reference input W signal. In this way, a relative amplitude minimum is first approached and then passed simply as a result of shifting the phase at oscillator 48. The point at which the minimum is passed is registered, for example, by means of a differentiator 57 at the output of AC/DC converter 29 and a downline zero comparator 59. When, as a result of sequential phase shifts, a point of minimum amplitude is passed, the output signal of zero comparator 59, insofar as the amplitude value still remains outside the tolerance window corresponding to the window in window comparator 53 with respect to reference input W, switches switch 44 to amplitude control input A of oscillator 48. Now, by means of the stepwise change in the amplitude value according to the result of the comparison in comparator 36, i.e., whether the instantaneous amplitude value is decreasing or increasing with respect to the previously measured value, the amplitude of the shift AC-signal generated in oscillator 48 is changed until an amplitude minimum is detected again. When at this point the controlled variable signal X corresponding to the ACTUAL amplitude is still outside the value, which can be preset by window comparator 53, with respect to the command signal W, then again the amplitude and the phase are shifted alternately. If the deviation of the amplitude value corresponding to the controlled variable signal X from the reference input value W is smaller than that preset in window comparator 53, this process is interrupted, and the phase and amplitude setting on oscillator 48 remains constant. For this purpose, it is obvious that memory or hold elements for the most recently transmitted control signal are connected to the two control inputs $\psi$ and A (not shown) and enabled.

Even if the fundamental frequency of the pulsation of the drive momentum M(t) according to FIG. 1 is constant over time, a possible time-variant frequency behavoir of the stage with synchronous generator 1 and downline network impedance 4 as with a change in its resonance points can give rise to disturbing components with changing frequencies in electrical signal E. A change in the resonance behavior of the overall stage can occur, for example, when there is change in the impedance appearing on the network side of the generator according to 4 in FIG. 1, as if loading of the generator is changed.

Another case in which the frequency of the disturbing component to be smoothed out can vary over time is when the fundamental frequency of the momentum pulsation is varied over time, such as when there is change in the driving speed of the driving machine. To make account in general of the possible time variance of the frequency of the disturbing component to be smoothed out in electrical parameter E on the output side of the synchronous generator, the frequency of frequency-selective units, such as of filter 27 and oscillator 48 in FIG. 3, is adjusted to follow these changes. In FIG. 3, the arrangement is shown for the case in which, with a constant fundamental frequency of the momentum pulsations, the stage frequency behavoir is varying in time so as to change the amplitude values of the spectral components in parameter E in such a way that at certain times the one component at one frequency and other times component at one or more other frequencies are to be smoothed out. For this purpose, the output signal of detector 25 is subjected to a spectral analysis in an analyzer 61; in a selector 63, the component which is the most disturbing is selected from the various frequency components according to preset criteria. For the sake of simplicity, this can be the component of all components with the greatest amplitude. At the output of selector 63 appears a frequency control signal dependent on the frequency of that component thus with the greatest amplitude, which control signal controls frequency-selective units provided in the system with respect to their selected frequency; according to FIG. 3, the frequencies of filter 27 and oscillator 48, namely, are thus adjusted to the frequency of the component which is most disturbing at the moment in question.

According to FIG. 3, for example, within the scope of feed-back controls already known to be used, such as Q/U feed-back controls described herein, another electrical parameter E' is measured at the output of generator 1 by means of a detector 65. It is sent as an additional controlled variable X' in turn to a difference unit 67, which is supplied with an additional reference input signal W', which can be set on an adjusting unit 69. The control difference appearing on the output side of difference unit 67 is also sent to controller 46. In the controller, and additional controller stage 71, parallel to oscillator 48, is provided, which also intervenes by way of an output-side summation stage 72 in the excitation by source 11 of generator 1. Because, acting on two controlled variables, X and X', namely, the disturbing component at frequency $f_E$ caused by pulsating moment in one electrical parameter such as in the active power, and on an additional controlled variable corresponding to E', such as on the reactive power, by the same single correcting variable, namely, the excitation $U_E$ of generator 1, it is necessary to make a compromise with respect to the achievable control effect on both controlled variables X, X', because of the lack of a second degree of correction freedom at $U_E$.

If, for example, a nearly complete elimination of the pulsation-caused component in the active power is desired, it must accepted that the reactive power corresponding to E' can hardly be feed-back controlled at that frequency $f_E$ of this component to the same extent, which means that a corresponding component will remain in the reactive power, if that inactive power is completely feed-back control eliminated. Through the dependent adjustment of the two reference input signal values W and W' at this frequency $f_E$, it is specified how far the component at this frequency will be smoothed out in the one parameter and how large a component will have to be tolerated at this frequency in the other electrical parameter.

Instead of intervening in the generator excitation $U_E$ to control the second controlled variable X' corresponding to E', it is possible, as already discussed in connection with FIG. 1, to make use of an additional correction possibility, namely, to act on the impedance occurring on the output side of generator 1, in that, for example, a controllable reactive power compensator is adjusted as a second correction element, so that two degrees of freedom for feed-back control are achieved.

In a further embodiment, a state-variable feed-back control system is especially preferred for the realization of the feed-back control described.

Figure 4:
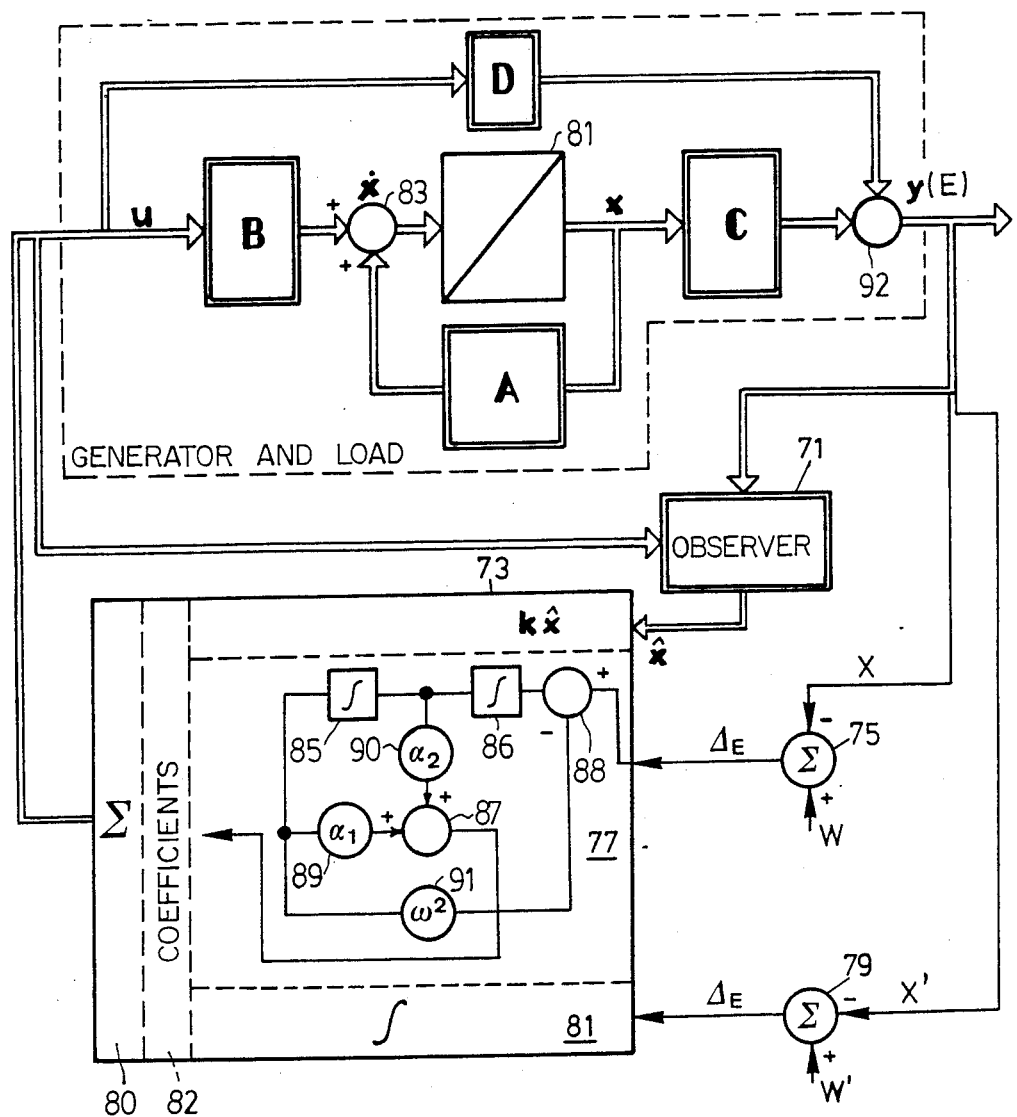
FIG. 4 shows a block diagram of another embodiment of the feed-back control according to the invention in state space.

According to FIG. 4, for this purpose the stage consisting of synchronous generator 1 and its load is represented by input matrix B, output matrix C, system matrix A, and possibly throughput matrix D. The input or control vector u corresponds in the present case to the generator excitation $U_E$. The vector x designates the vector of state of the stage; the vector $\dot{x}$ designates its derivation with respect to time; output vector y corresponds to the electrical parameters E measurable on the output side of the synchronous generator, such as the current or voltage values. Because the vector of state x does not correspond to the output vector y, a vector of state x is estimated on the basis of output vector y and the control vector u by means of an observer 71; observer 71, which can be interpreted as a model of the stage, uses output vector y and the input vector u supplied to it to determine the estimated vector of state $\hat{x}$, in that the observer minimizes the difference between measured vector y and calculated vector $\hat{y}$ calculated from vector u (see e.g.: Luenberger, D.G.: An introduction to observers. IEEE Trans. Autom. Control, AC-16 (1971), 596-602). The vector of state $\hat{x}$ is sent to controller 73, where it is multiplied by the coefficients k. The one electrical parameter, such as the active power, in which the pulsation component is to be smoothed out, is in turn tapped as an output parameter X, sent to a difference unit 75, and there it is compared with and adjustable reference input signal W. The resulting control difference $\Delta_E$ is sent to the amplitude-and-phase-adjustable oscillator 77 in controller 73.

As an additional controlled variable X', a further electrical parameter is tapped at the output of the generator, such as the reactive power, and is sent to a difference unit 79. In difference unit 79, an additional control difference $\Delta_E$ is formed from the values X' and W', an adjustable reference value, which difference is sent to an additional controller stage 81, such as an integrator in controller 73. The vector of state $\hat{x}$ multiplied by the coefficient k, the output of oscillator 77, and the output of controller stage 81 are finally added at 80 after having weighted by additional coefficients at 82 in controller 73 at M and thus control the input vector u of the stage, the generator excitation, on the output side of controller 73.

For the sake of clarity, it must be pointed out that the electrical parameters of interest E and E' are components of the output vector y.

In FIG. 4 the reference 83 designates a vector summing circuit, 84 an integrating circuit, 85 and 86 integrating circuits; 87 and 88 summing and difference forming circuits respectively; 89, 90, 91 multiplying circuits for respective multiplication of the input values by coefficients $\alpha_1$, $\alpha_2$ and $\omega_{pn}^2$ according to $\omega_{pn}$, (1), (2); 92 a vector summing circuit.

Figure 5:
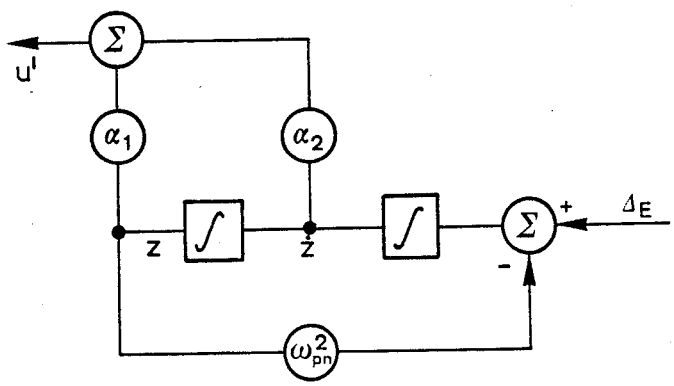
FIG. 5 shows a preferred embodiment of an oscillating unit in a controller according to FIG. 1, FIG. 3, or FIG. 4.

FIG. 5 shows the structure of oscillator 77 in controller 73 already indicated in FIG. 4. This is an analog or digitally programmed differential equation structure with programming of the expressions:

$$\ddot{z} + \omega_{pn}^2 = \Delta(\omega_{pn}) \tag{1}$$

$$u' = \alpha_1 \dot{z} + \alpha_2 z \tag{2}$$

where
- $\omega_{pn}$ = the angular frequency of the pulsation component to be reduced;
- $\Delta(\omega hd\ pn)$ = the control difference;
- $z$ = an auxiliary parameter of state, $\dot{z}$ and $\ddot{z}$ being its first and second derivatives with respect to time;
- $\alpha_1$, $\alpha_2$ = coefficients, which preferably can be adjusted to the specific stage; and
- $u'$ = the shift signal for setting the physical parameters, By means of the coefficients $\alpha_1$ and $\alpha_2$, which can be set specifically for the stage of interest, the stability of the feed-back control system can be guaranteed.

The proposed feed-back control is suitable especially for use with synchronous generator in isolated operation and for use in a rigid network and is able to smooth out the pulsations of small amplitude mentioned with ease, also when the load on the generator varies on the network side.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

We claim:

1. A method for reducing at least one frequency component of a periodic pulsation in at least one electrical parameter at an output of a syncronous generator powered by a pulsating drive momentum of a drive engine, where the fundamental frequency of the pulsation with said component to be reduced deviates from the natural frequency of said synchronous generator, whereby:
   - said component is detected as controlled variable;
   - a control difference is determined from said detected controlled variable and a predetermined reference value;
   - as a function of said control difference, at least one physical parameter of a stage formed by said drive engine, said synchronous generator, and network connected downline from said synchronous generator is automatically corrected within an automatic feed-back control loop;
   - detecting an additional electrical parameter appearing at said output of said synchronous generator as an additional controlled variable;
   - subtracting another reference value therefrom to develop an additional control difference; and
   - correcting an additional physical parameter in said stage as a function of said additional control difference within an automatic feed-back control loop.

2. A method for reducing at least one frequency component of a periodic pulsation in at least one electrical parameter at an output of a synchronous generator powered by a pulsating drive momentum of a drive engine, where the fundamental frequency of the pulsation with said component to be reduced deviates from the natural frequency of said synchronous generator; whereby:
   - said component is detected as a controlled variable;
   - a control difference is determined from said detected controlled variable and a predetermined reference value;
   - as a function of said control difference, at least one physical parameter of a stage formed by said drive engine, said synchronous generator, and a network connected downline from said synchronous generator is automatically corrected within and automatic feedback control loop;
   - said drive engine being a Diesel engine whereby, as said physical parameter, instantaneous operating conditions at cylinders of said Diesel engine are adjusted, such as at least one of the fuel injection timing and amount of fuel injected.

3. A method, according to claim 1, whereby, as said physical parameter, an excitation of the synchronous generator is automatically corrected.

4. A method, according to claim 1, whereby feedback control of said feedback control loop is carried out in a frequency selective manner on said frequency of said component to be reduced of said periodic pulsation.

5. A method, according to claim 4, whereby said frequency of said component is measured, and said selectivity is adjusted as a function of said measured frequency.

6. A method, according to claim 1, whereby, as said one physical parameter and as said additional physical parameter, the same physical parameter is automatically corrected.

7. A method, according to claim 1, whereby the automatic feedback control of said one controlled variable and the automatic feedback control of said additional controlled variable are decoupled from each other with respect to frequency, and said feedback control of said one controlled variable is carried out preferably in a frequency-selective manner on the frequency of said component to be reduced within said pulsation.

8. A method, according to claim 1, whereby, as said additional physical parameter, an impedance connected to said output of said synchronous generator, such as a reactive power compensator, is adjusted.

9. A method, according to claim 6, whereby, at said frequency of said component to be reduced, reference values which are dependent of each other are applied for said feedback controls of said one and of said additional controlled variable.

10. A method, according to claim 1, whereby a shift signal with a frequency equal to said frequency of said component to be reduced is generated and said physical parameter is corrected therewith, at least one of an amplitude and phase of said shift signal being adjusted as a function of said control difference.

11. A method, according to claim 10, whereby an instantaneous frequency of said component to be reduced is measured and said frequency of said shift signal is adjusted accordingly.

12. A method, according to claim 10, whereby said shift signal is generated from two orthogonal shift signal components which are weighted and added.

13. A method, according to claim 10, whereby said phase and said amplitude of said shift signal are successively adjusted and said control difference is observed and minimized successively.

14. A method, according to claim 13, whereby in said control difference, a frequency component of a frequency corresponding to that of said component is observed for the purpose of adjusting said at least one of said phase and said amplitude of said shift signal.

15. A method, according to claim 10, whereby said shift signal is generated by programming expressions:

$$\ddot{z} + \omega_{pn}^2 = \Delta(\omega_{pn}) \qquad (1)$$

$$u' = \alpha_1 \dot{z} + \alpha_2 z \qquad (2)$$

where
- $\omega_{pn}$ = an angular frequency of said pulsation component to be reduced;
- $\Delta(\omega_{pn})$ = said control difference;
- z = an auxiliary parameter of state, $\dot{z}$ and $\ddot{z}$ being its first and second derivatives with respect to time;
- $\alpha_1$, $\alpha_2$ = coefficients, which preferably can be adjusted to said specific stage; and
- u' = said shift signal for correcting said physical parameters.

16. A method, according to claim 1, whereby said feed-back control is carried out in state space; at least the controlled variable or controlled variables being used as output parameter(s) of said stage; at least the physical parameter(s) being used as input as input parameter(s) of said stage.

17. A method, according to claim 16, whereby the parameters of state of said stage are determined by means of an observer (71) on the basis of said input parameter(s) and said output parameter(s).

18. A system for reducing at least one frequency component of a periodic pulsation of at least one electrical parameter at an output of a synchronous generator powered by a pulsating drive momentum of a drive engine, where the fundamental frequency of the pulsation with said component to be reduced deviates from the natural frequency of said synchronous generator, comprising an automatic feed-back control loop with:
(a) detector means connected to a stage formed by said drive engine, said synchronous generator, and a network supplied by the generator, for detecting at least one controlled variable signal, in dependency from said component to be reduced;
(b) a controller means connected to the output of said detector means; and
(c) at least one correcting means connected to the output of said controller means, which corrects on the output side at least one physical parameter of said stage, on which said component depends;
said controller means comprising oscillator means oscillating at said frequency of said component to be reduced, said oscillator means being controlled by an output of said detector means; and acting on said output of said controller means.

19. A system, according to claim 18, drive engine being a Diesel engine driving said synchronous generator, said correcting means comprising a controllable injection system for said Diesel engine.

20. A system, according to claim 18, said synchronous generator comprising excitation means, said correcting means acting on said excitation means of said synchronous generator.

21. A system, according to claim 18, said correcting means acting on an electrical impedance at the output of said synchronous generator, preferably on a controllable reactive power compensator.

22. A system, according to claim 18, said detector means comprising an amplitude detection means operating selectively on said frequency of said component to be reduced, the output of said detection means acting on an amplitude control input of said oscillator means.

23. A system, according to claim 18, comprising a control unit, comparing an amplitude of said controlled variables at least at said frequency of said component to be reduced at successive points in time and selectively intervening on at least one of a phase-control means and of an amplitude-control means of said oscillator means.

24. A system, according to claim 18, said automatic feed-back control loop comprising frequency measurement means, the output of which acts on a frequency control means for controlling the frequency of said oscillator means.

25. A system, according to claim 18, said detector means detecting at said stage an additional signal being dependent from another electrical parameter to be controlled at said output of said synchronous generator, said detector acting with a signal dependent from said additional signal on a controller stage of said controller provided in parallel with said oscillator.

26. A system, according to claim 25, comprising selector means to select the component to be reduced.

27. A system, according to claim 18, said detector means detecting said component within said electrical parameter directly as said controlled variable.

28. A system, according to claim 18, said oscillator means being formed by a structure of an oscillation-differential equation.

29. A system, according to claim 18, said oscillator generating two orthogonal oscillation componets and comprising a weighting unit to weight said orthogonal components and a summation unit to add said weighted orthogonal components.

30. A system, according to claim 18, said controller comprising a controller of state.

31. A system, according to claim 30, comprising an observer, as a model of the stage, using output signals from said detector means and signals corresponding to said corrected physical parameters as an input vector to determine the vector of state of said stage.

32. A system, according to claim 18, said detector means detecting said component from at least one of voltage and power from said output of said synchronous generator.

33. A method for reducing at least one frequency component of a periodic pulsation in at least one electrical parameter at an output of a synchronous generator powered by a pulsating drive momentum of a drive engine, where the fundamental frequency of the pulsation with said component to be reduced deviates from the natural frequency of said synchronous generator, whereby:
said component is detected as a controlled variable;
a control difference is determined from said detected controlled variable and a predetermined reference value;
as a function of said control difference, at least one physical parameter of a stage formed by said drive engine, said synchronous generator, and a network connected downline from said synchronous generator is automatically corrected within an automatic feedback control loop; and
generating a shift signal with a frequency equal to said frequency of said component to be reduced and utilizing the frequency signal to correct said physical parameter, at least one of the amplitude and phase of said shift signal being adjusted as a function of said control difference.

34. A method, according to claim 33, whereby, as said physical parameter, an excitation of the synchronous generator is automatically corrected.

35. A method, according to claim 33, whereby detecting an additional electrical parameter appearing at said output of said synchronous generator as an additional controlled variable, therefrom and from another reference value an additional control difference is determined; and correcting an additional physical parameter in said stage as a function of said additional control difference within an automatic feedback control loop.

36. A method, according to claim 35, whereby as said one physical parameter and as said additional physical parameter, the same physical parameter is automatically corrected.

37. A method, according to claim 35, whereby, as said additional physical parameter, an impedance connected to said output of said synchronous generator, such as a reactive power compensator, is adjusted.

38. A method, according to claim 36, whereby, at said frequency of said component to be reduced, reference values which are dependent upon each other are applied for said feedback controls of said one and of said additional controlled variable.

39. A method, according to claim 33, whereby an instantaneous frequency of said component to be reduced is measured and said frequency of said shift signal is adjusted accordingly.

40. A method, according to claim 33, whereby said shift signal is generated from two orthogonal shift signal components which are weighted and added.

41. A method, according to claim 33, whereby said phase and said amplitude of said shift signal are successively adjusted and said control difference is observed (71) and minimized successively.

42. A method, according to claim 41, whereby, in said control difference, a frequency component of a frequency corresponding to that of said component is observed (71) for the purpose of adjusting said at least one of said phase and said amplitude of said shift signal.

43. A method, according to claim 33, whereby said shift signal is generated by programming expressions:

$$\ddot{z} + \omega_{pn}^2 = \Delta(\omega_{pn}) \quad (1)$$

$$u' = \alpha_1 \dot{z} + \alpha_2 z \quad (2)$$

where
- $\omega_{pn}$ = an angular frequency of said pulsation component to be reduced;
- $\Delta(\omega_{pn})$ = said control difference;
- z = an auxiliary parameter of state, $\dot{z}$ and $\ddot{z}$ being its first and second derivatives with respect to time;
- $\alpha_1$, $\alpha_2$ = coefficients, which preferably can be adjusted to said specific stage; and
- u' = said shift signal for correcting said physical parameters.

44. A method, according to claim 33, whereby said feedback control is caried out in state space; at least the controlle variable or controlled variables being used as output parameter(s) of said stage; at least the physical parameter(s) being used input parameter(s) of said stage.

45. A method, according to claim 44, whereby the parameters of state of said stage are determined by means of an observer (71) on the basis of said input parameter(s) and said output parameter(s).

* * * * *